(12) United States Patent
Hodge et al.

(10) Patent No.: US 6,314,378 B1
(45) Date of Patent: Nov. 6, 2001

(54) DISTRIBUTED FREQUENCY RELAY

(75) Inventors: James Graham Hodge; Roger Anthony Sutton, both of Christchurch (NZ)

(73) Assignee: CLC Global LLC, Nashville, TN (US)

( * ) Notice: Subject to any disclaimer, the term of this patent is extended or adjusted under 35 U.S.C. 154(b) by 0 days.

(21) Appl. No.: 09/164,804

(22) Filed: Oct. 1, 1998

Related U.S. Application Data

(63) Continuation of application No. PCT/NZ97/00043, filed on Apr. 1, 1997.

(30) Foreign Application Priority Data

Apr. 1, 1996 (NZ) .......................................... 286298

(51) Int. Cl.$^7$ .................................................. H01H 47/20

(52) U.S. Cl. .......................... 702/57; 700/296; 307/129; 324/76.39

(58) Field of Search ........................ 307/73, 129; 702/57, 702/58, 60; 324/76.39; 361/62; 700/286, 292, 293, 294, 295, 296

(56) References Cited

U.S. PATENT DOCUMENTS

| | | | |
|---|---|---|---|
| 4,385,241 | 5/1983 | Peddie et al. . | |
| 4,464,724 | * 8/1984 | Gurr et al. | 364/492 |
| 4,686,630 | * 8/1987 | Marsland et al. | 364/492 |
| 4,843,328 | 6/1989 | Greenhall . | |
| 4,855,922 | * 8/1989 | Huddleston et al. | 364/464.04 |
| 5,488,565 | * 1/1996 | Kennon et al. | 364/483 |
| 5,687,052 | * 11/1997 | Bennett | 361/190 |
| 5,987,393 | * 11/1999 | Stinson | 702/105 |
| 5,995,911 | * 11/1999 | Hart | 702/64 |
| 6,061,609 | * 5/2000 | Kanoi et al. | 700/291 |

FOREIGN PATENT DOCUMENTS

| | | |
|---|---|---|
| 297 418 | 1/1989 | (EP) . |
| 54101143 | 9/1979 | (JP) . |
| 522846 | 1/1993 | (JP) . |
| 919044 | 1/1997 | (JP) . |
| 99488 | 1/1997 | (JP) . |
| 464937 | 7/1975 | (SU) . |
| 479195 | 10/1975 | (SU) . |
| 907661 | 2/1982 | (SU) . |
| WO 89/08342 | 9/1989 | (WO) . |

OTHER PUBLICATIONS

Thompson et al., Adaptive Load Shedding for Isolated Power System, IEEE, Sep. 1994.*
Morrow et al., "Low–Cost Under–Frequency Relay for Distributed Load Shedding", IEEE, 1991.*
Stringer, "Dynamic Testing of Frequency Relays", IEEE, Apr. 1996.*

(List continued on next page.)

Primary Examiner—Patrick Assouad
(74) Attorney, Agent, or Firm—Greer, Burns & Crain, Ltd.

(57) ABSTRACT

A method of increasing the system stability of an electricity supply network including the steps of locating programmable frequency sensitive relays at load shedding points within the network. Each relay controls one or more loads and contains programmable disconnect and reconnect conditions. One or more of the loads are disconnected from the network upon a relay detecting the programmable disconnect conditions. Each relay reconnects the load to the network when it detects the programmable reconnect conditions. Each relay includes a device for detecting the network frequency, a micro-processor including memory and software and a switching mechanism to disconnect and reconnect one or more of the loads. Each relay is programmed from a centralized network stability manager which can designate programmable conditions for each relay. The communications between each relay and the stability manager can be via broadcast or sequential point-to-point communications.

14 Claims, 3 Drawing Sheets

OTHER PUBLICATIONS

Lindahl et al., "Operational Experience of Load Shedding and New Requirements on Frequency Relays", IEEE, Mar. 1997.*

Jones et al., "Computer Algorithm for Selection of Frequency Relays for Load Shedding", IEEE, 1988.*

Batur et al., "A Proposed Application of an Industrial DOS Computer for Distribution Substation Monitoring and Control", IEEE, 1993.*

Peck et al., "A Second Generation Microprocessor Line Protection Relay", IEEE, 1988.*

Ait–Kheddache et al., "Optimal Load Sheeding Methodologies in Power Systems", IEEE, 1988.*

Fong et al., "Integration of Substation Protection, Control and Data Acquisition Systems", IEEE, May 1996.*

Mackrell et al., "Central Testing and Site Commissioning for a New User Programmed, 33KV Feeder Protection", IEEE, 1993.*

Sachdev et al., "A New Microprocessor–Based Relay for Transmission Line Protection", IEEE, 1991.*

(1) Ahmad et al., A Digital Frequency Relay For Over/Under Frequency Detection, IEEE International Conference on $EC^3$–Energy, Computer Communication and Control Systems, 1991, p. 440–442.

* cited by examiner

DISTRIBUTED FREQUENCY RELAY

This application is a continuation of International Application Serial No. PCT/NZ97/00043, filed Apr. 1, 1997, which claims priority from New Zealand Application No. 286298 filed Apr. 1, 1996.

FIELD OF INVENTION

The present invention relates to a method of increasing the electricity supply network stability without increasing its spinning reserve. This is achieved using one or more systems of distributed frequency relays.

BACKGROUND OF INVENTION

Traditionally electricity system stability has been provided by spinning reserve, which is spare generating capacity available to the system should unexpected loads, such as a large fault, threaten system stability. Spinning reserve is expensive as it does not produce any revenue for the generating company but it is required for system stability.

Attempts have been made to supplement the stabilizing effect of spinning reserve with fixed frequency relays fitted to major loads or sub-stations within a network. These relays disconnect their loads if the system frequency (nominally for example 50 hertz) drops too much indicating a system disturbance such as a major fault. The loads are then reconnected when the system has stabilised. The major disadvantage of this arrangement is its inflexibility. The dynamic nature of the loading on a network means that over time the network will require different stabilizing tactics which cannot be accommodated satisfactorily by the fixed parameters of these frequency relays.

SUMMARY OF THE INVENTION

An object of the present invention is the provision of an improved method of increasing an electricity supply network's stability, which minimises the above mentioned problems.

The present invention provides a method of increasing the system stability of an electricity supply network, said method including locating programmable frequency sensitive relays at load shedding points within said network, wherein each said relay controls one or more loads connected to said network and contains programmable disconnect and reconnect conditions such that one or more said loads are disconnected from said network upon said relay detecting said programmable disconnect conditions on said network, and such that one or more said loads are reconnected to said network upon said relay detecting said programmable reconnect conditions or said network.

Preferably said method includes providing a network stability manager with the ability to change or update said programmable disconnect and reconnect conditions by a communications link to said relays.

Preferably said load shedding points include any one of the following groups: sub-stations; factories; office buildings; households; plant; appliances; and a combination of these.

Preferably said programmable disconnect conditions include: low frequency disconnect levels; high frequency disconnect levels; rate of increase or decrease of frequency disconnect levels; a combination of these. Said relays can include a delay period or minimum duration of said condition prior to said disconnection.

Preferably said programmable reconnect conditions include: low frequency reconnect levels; high frequency reconnect levels; rate of increase or decrease of frequency reconnect levels; expiration of a disconnection period; a combination of these. Said relays can include a delay period or minimum duration of said condition prior to said reconnection.

The ability to reprogram the programmable conditions of each relay allows the stabilizing effect which they produce to be maximised despite changing conditions on the network. This capability is of considerable importance to the authority managing the network and a considerable advantage over the fixed frequency relays currently available. Another advantage of the present invention is that it is not reliant on a real time communication link; for example, to disconnect loads in the event of a system emergency. In this instance the distributed relays operate according to their most recent programmable conditions update. A further advantage of this present invention is that it is not restricted to monitoring frequency changes alone but can monitor, for example, rate of change of frequency and react accordingly. Parameters such as rate of change of frequency can sometimes be as important as the change in frequency itself.

The relays can be used to control all the load with which they are associated by, for example, disconnecting/reconnecting all sub-station circuits. Alternatively they may incorporate, be incorporated into, or be used in conjunction with a load shed management facility. For example in the case of households as load shedding points, the load shed manager could be the device for the operation of appliances, utilities and services within a building of New Zealand patent application no. 280179 (PCT/NZ96/00110).

When used with load shed management, the relay will control only a pre-programmed part of the available load in response to a network condition. The controlled load may be reprogrammed by the network stability manager for example. As a further enhancement, the load to be controlled by the relay (and load shed manager) may be dependent on the type of condition detected on the network. Further, the relay may control more than one load or group of loads according to different programmable conditions. For example, a minor fault may only require hot water cylinders (or an equivalent load) in a domestic premises to be disconnected, while a major fault may require all power to the premises to be disconnected.

DESCRIPTION OF THE DRAWINGS

By way of example only, two preferred embodiments of the present invention are described in detail with reference to the accompanying drawings, in which.

DETAILED DESCRIPTION OF PREFERRED EMBODIMENTS

Figure 1:
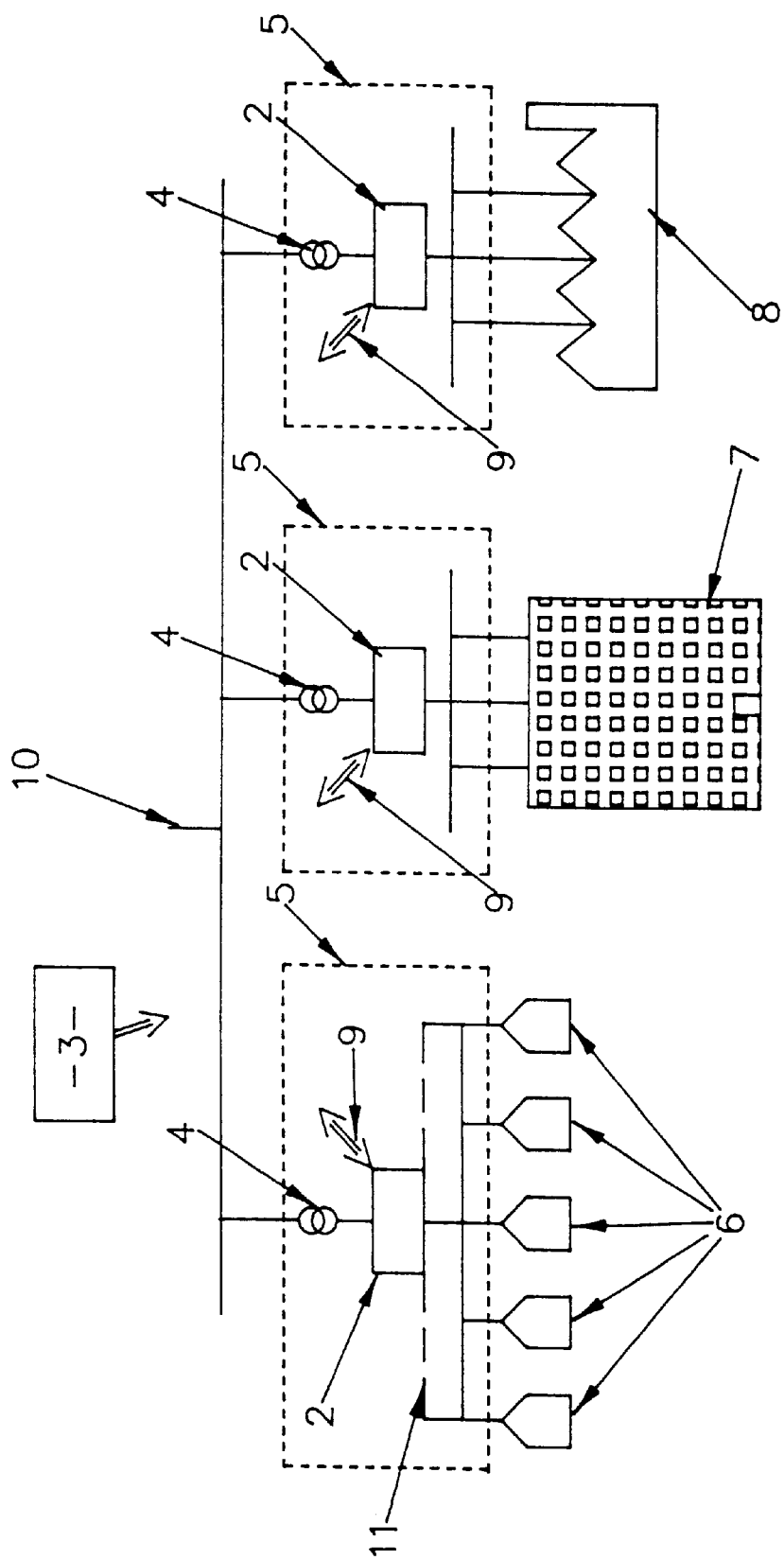
FIG. 1 shows a schematic diagram of a first preferred embodiment of the present invention.

Referring to FIG. 1 the method of the present invention is there shown. The electricity supply network 10 supplies sub-stations 5 which transform (using transformers 4) this supply to 400/230V, for use by houses 6, office buildings 7 and factories 8. The loads associated with each sub-station 5 can be connected or disconnected from the network 10 by programmable frequency relays 2 which operate according to their programmed disconnect and reconnect conditions and actual conditions on the network 10. The programmable conditions or parameters are set by a system stability manager 3, which designates programmable conditions for each relay 2 depending on its location in the network 10, and the loadings present at that part of the network 10. A communications channel 9 is used to update the programmable conditions or parameters of each relay 2. This can operate via broadcast or sequential point to point communication using telephone or power line carrier links, for example:

The preferred relay 2 includes the following parameter list:
1. lower frequency deviation trigger levels (LDT)
2. rate of fall in frequency trigger levels (LDT)
3. a combination of absolute and rate of change of frequency as a trigger levels (LDT)
4. lower frequency deviation dwells (LDD)
5. lower frequency active periods (LAP)
6. lower frequency reset delays (LRD)
7. upper frequency deviation trigger levels (UDT)
8. rate of rise in frequency trigger levels (UDT)
9. a combination of absolute and rate of change of frequency as a trigger levels (UDT)
10. upper frequency deviation dwells (UDD)
11. upper frequency active periods (UAP)
12. upper frequency reset delays (URD)

Depending on relay 2 and network stability manager 3 configuration, the relay 2 may also contain programmable parameters to independently control more than one load or group of loads so that for example one group of loads may be disconnected in the event of a network fault at one time of day, whereas another group may be disconnected at another time of day. The particular group to be disconnected being updated by the system stability manager 3 or alternatively programmed into a relay 2 with a clock/date facility, for example.

The relays 2 can also be configured using additional programmable parameters to disconnect different groups of loads following different conditions on the network 10. For example the relay 2 can be configured to include two lower frequency deviation trigger levels (LDT) such that upon detection of the first trigger level the relay 2 disconnects one group of loads such as domestic premises but not commercial premises. Upon detection of a second even lower frequency trigger level the relay 2 disconnects another group of loads such as all premises, for example.

The particular load shedding regime current on a relay 2 can be updated by the system stability manager 3 via the communications channel 9.

Referring to the lower frequency block of parameters (to which the upper frequency block are analogous), the lower frequency deviation trigger level (LDT) is the mains frequency condition or conditions at which the relay 2 is triggered to disconnect loads controlled by it and includes a particular absolute frequency (for example 48 or 52 hertz in a 50 hertz system), a rate of decrease (or increase) of the absolute frequency (for example a drop or increase of 2 hertz in 1 second) or a combination of these. Each relay 2 may contain more than one LDT to control different combinations of load shedding, for example. The particular load shed combination corresponding to each LDT is recorded as a programmable parameter within the relay 2 and can be updated as required by the network stability manager 3. Alternatively, the load shedding combination may be controlled by a separate load shed manager 11 used in conjunction with the relay 2, the relay signalling a first and a second level of load shedding for example.

Detection of a trigger level LDT is followed by the lower frequency deviation dwell (LDD) which is the period before correcting action is taken. This may vary depending, for example, on the type of trigger detected and the continuance of the detected condition. For example, a large and sudden drop in the mains frequency may result in a very short LDD. The LDD is followed by the lower frequency active period (LAP) during which a programmed load or group of loads is disconnected for a programmed period. The programmed period (LAP) may be a preset disconnection period. Alternatively the disconnection period may last until the mains frequency stabilises within a preprogrammed range, for example.

This load disconnection in combination with other distributed load shedding by other programmable frequency relays (not shown) on the network 10, stabilises the network 10 against the disturbance causing the drop in system frequency.

When the network 10 has reached a programmed recovery point, for example the expiration of the LAP and/or a preprogrammed mains frequency range, the load is reconnected. Each relay 2 then enters a lower frequency reset delay (LRD) which allows the network conditions to normalise further (under normal recovery), until the network conditions are such that each relay 2 will not trigger when re-enabled (unless of course a fault condition remains or reoccurs). After the LRD each relay 2 is re-enabled to detect any further disconnect conditions within the network 10.

All programmable relay parameters can be updated as required by the system stability manager 3 using the communications channel 9.

Figure 2:
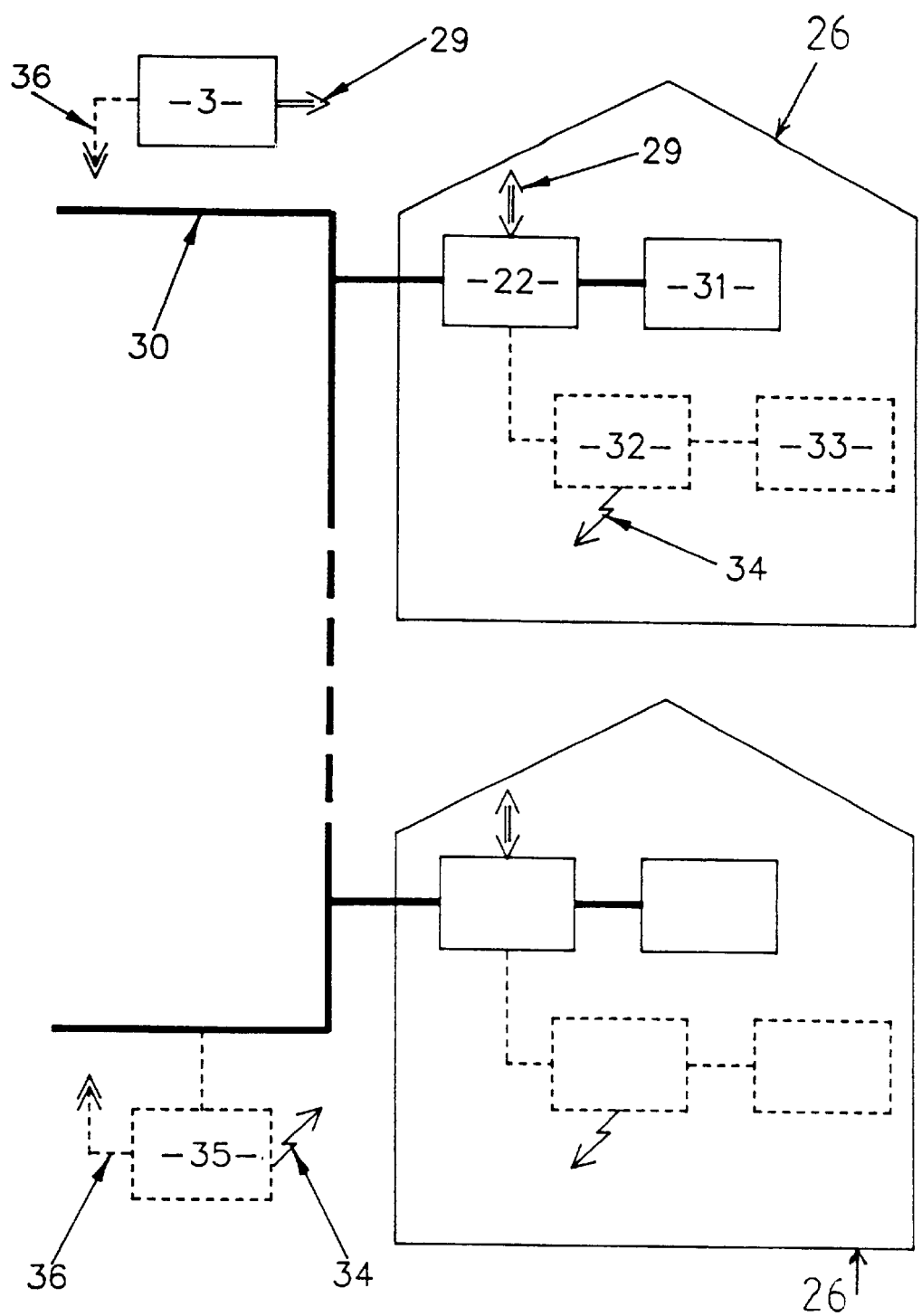
FIG. 2 shows a schematic diagram of a second preferred embodiment of the present invention.

FIG. 2 shows a second preferred embodiment of the present invention. In this embodiment the method of stabilising the network 30 is further distributed by including a programmable frequency relay 22 at each consumer's premises 26. Further distribution is possible by including relays 22 in individual domestic appliances for example.

The relay 22 works in the same way as the relay 2 of the first preferred embodiment but on a smaller scale, and is connected on the part of the network 30 downstream of the sub-station 5 (not shown). The relay 22 can be used in conjunction with pre-determined household loads 31 such as hot water cylinders. Alternatively the relay 22 can be configured to control more than one load or group of loads, each being associated with different programmed disconnect parameters or conditions (LDT's) and disconnection periods (LAP's), for example.

As a further alternative, the relay 22 can be used in conjunction with, or be incorporated, into a load shed manager 32 similar to the load shed manager 11 of the first preferred embodiment. The loads to be disconnected during the LAP phase can be reassigned using a load shed communications link 34 by an overall load shed controller 35. The load shed manager 32 and controller 35 could be implemented using the device for the operation of appliances, utilities and services within a building of New Zealand patent application 280179 (PCT/NZ96/00110), for example. As previously described in the first preferred embodiment, the loads to be disconnected can also be made dependent on the type of network condition (LDT), separate LAP's being assignable for each LDT.

The system stability manager 3 sets the parameters associated with each relay 22 by a relay communications link 29, preferably by broadcast or sequential point to point communications. The stability manager 3 may be configured to liaise with the load shed managers overall controller 35 (if load shed managers 32 are used) via a load controller communications link 36.

Figure 3:
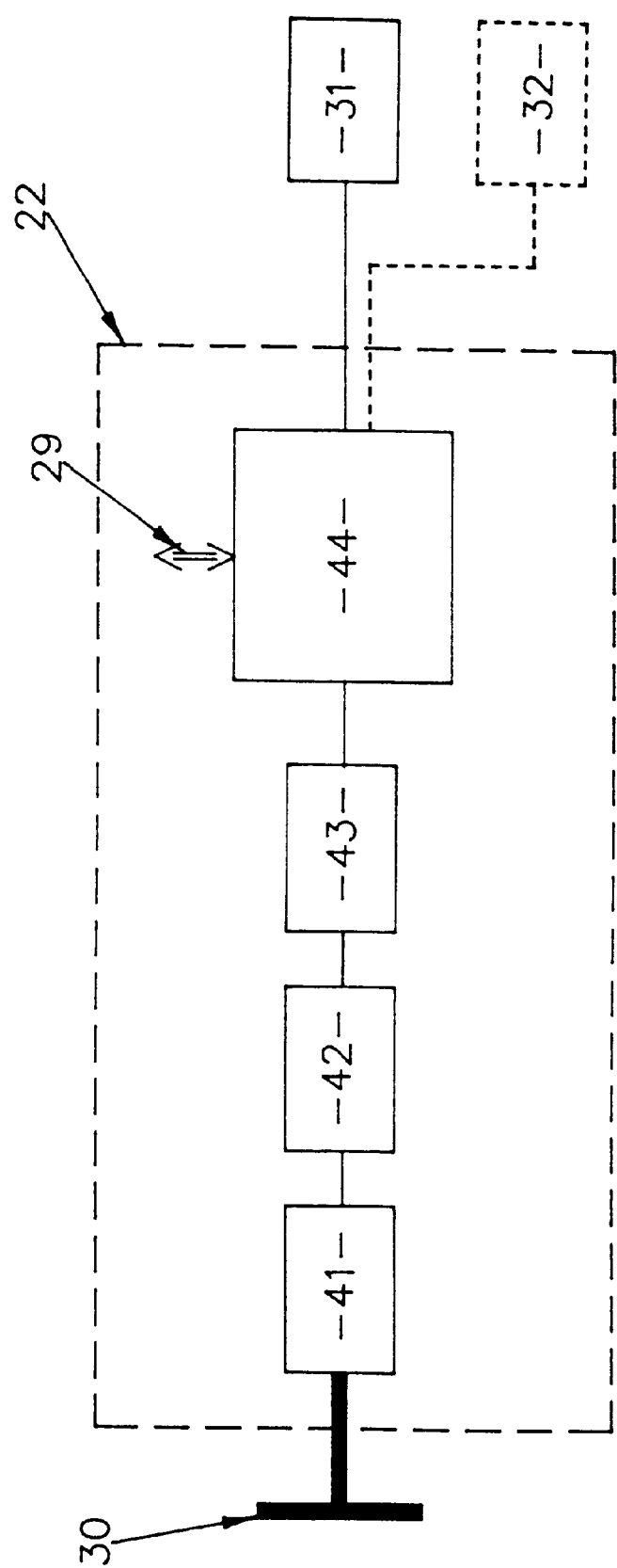
FIG. 3 shows a block circuit diagram of a programmable frequency relay.

Referring to FIG. 3, the programmable frequency relay 22 monitors the system frequency of the local section of the network 30 and includes: an attenuator 41; a system frequency band pass filter 42; a signal squarer 43; and a micro-controller and software 44.

The micro-controller 44 controls a predetermined load 31, by connecting or disconnecting the same depending on its programmed parameters and actual detected conditions on the network. Alternatively the micro-controller 44 signals the load shed manager 32 to connect or disconnect programmed loads as appropriate. As a further alternative, the relay 22 may be designed and configured to control a programmable number and/or combination of loads.

The attenuator 41 reduces the supply voltage to a manageable level for monitoring. The system frequency band pass filter 42 is used to attenuate system frequency harmonics and high frequency noise. The signal squarer 43 is used to help determine zero crossings in the system frequency signal in spite of the remaining noise. This allows for a technique of signal tracking which measures period.

The micro-controller 44 runs a software algorithm which implements phase to frequency clock generation, phase comparison and low pass filtering functions, to produce a clean smoothly tracking signal which can be used in monitoring the system frequency signal. This can be compared against the programmed parameters mentioned above to determine whether and what action is required in terms of load connection or disconnection.

The reason for using this approach is its low cost. It is important, particularly in the second preferred embodiment, that each programmable frequency relay 22 is of very low cost so that they can be installed in household premises 26 (or similar) region or nationwide.

The micro-controller 44 can alternatively run software which implements a digital fourier transform algorithm, the output voltage being proportional to the network frequency. More preferably, two digital fourier transform (DFT) algorithms are implemented which operate at slightly different sampling rates such that a frequency discriminator is formed by taking the ratio of the two digital fourier transform results.

A single DFT algorithm measures the average voltage over a number of sample periods, the output voltage being proportional to the network frequency. However the voltage output will also be affected by amplitude variation in the mains voltage. Using the ratio of 2 DFT algorithms as outlined above produces amplitude independent frequency detection.

Preferably the micro-controller 44 is a low cost type such as a 4 MHz 89C2051 with 128B RAM and a 4 MHz crystal.

Preferably the band pass filter 42 and signal squarer 43 are implemented using dual signal op-amps with an input stage providing a unity gain Sallen Key low pass filter with its 3 dB point at 70 Hz and a second stage providing a squaring function with high gain and small hysteresis.

A narrower band width filter is not used as this will introduce a group delay of several hundred milliseconds, which will dramatically affect the ability of the relay 22 or 2 to respond quickly to changes on the network.

Preferably the relay 22 or 2 should obtain an accuracy of frequency measurement of at least 0.1 Hz.

Preferably the relay 22 or 2 should obtain a response time of less than 1 second.

Preferably the relay 22 or 2 should act independently of noise spikes and harmonics on the supply signal.

What is claimed is:

1. A method of increasing the system stability of an electricity supply network, said method including locating programmable frequency sensitive relays at load shedding points within said network, characterized in that each of said relays controls one or more loads connected to said network and contains programmable disconnect and reconnect conditions such that one or more said loads are disconnected from said network upon said relay detecting said programmable disconnect conditions on said network, and such that one or more said loads are reconnected to said network upon said relay detecting said programmable reconnect conditions on said network;

programming each said relay by a centralized network stability manager with respective programmable conditions transmitted by a broadcast or sequential point to point communications link, wherein said programmable disconnect conditions include a low frequency disconnect level and a rate of decrease in frequency disconnect level, and said programmable reconnect conditions include a high frequency reconnect level and a rate of increase in frequency reconnect level.

2. A method as claimed in claim 1, wherein each said relay contains said programmable conditions for more than one load or group of loads controlled by said relay.

3. A method as claimed in claim 1, wherein each said relay implements a delay after detecting said disconnect conditions or a minimum duration of said conditions before disconnecting said loads.

4. A method as claimed in claim 1, wherein each said relay implements a delay after detecting said reconnect conditions or a minimum duration of said conditions before reconnecting said loads.

5. A method as claimed in claim 1 characterized in that said load shedding points are selected from the following: substations; factories; office buildings; households; individual appliances; plant; a combination of any one of the preceding load shedding points.

6. A method as claimed in claim 1, wherein said load shedding points are selected from the following: substations; factories; office buildings; households; individual appliances; plant; a combination of any one of the preceeding load shedding points.

7. A programmable frequency sensitive relay for location in an electricity supply network, said relay including: means for detecting a network frequency and a rate of change of network frequency; micro-processor means including memory means and software; means for disconnecting and reconnecting one or more loads to said network; characterized in that said micro-processor means stores and compares programmable disconnect and reconnect conditions with said detected network frequency and rate of change of network frequency such that one or more said loads are disconnected from said network upon said micro-processor means detecting said programmable disconnect conditions and such that one or more said loads are reconnected to said network upon said micro-processor means detecting said programmable reconnect conditions, wherein said programmable disconnect conditions include a low frequency disconnect level and a rate of decrease in frequency disconnect level; and said programmable reconnect conditions include a high frequency reconnect level and a rate of increase in frequency reconnect level.

8. A programmable frequency sensitive relay as claimed in claim 7, wherein said relay is reprogrammed by a centralised network stability manager.

9. A programmable sensitive relay as claimed in claim 7, wherein said frequency detection means includes a signal squarer.

10. A programmable frequency sensitive relay as claimed in claim 7 wherein said frequency detection means includes a software algorithm run by said micro-processor means which implements phase to frequency clock generation, phase comparison and low pass filtering functions.

11. A programmable frequency sensitive relay as claimed in claim 7, wherein said frequency detection means includes a software algorithm run by said micro-processor means which implements a first digital fourier transform algorithm with an output proportional to said network frequency.

12. A programmable frequency sensitive relay as claimed in claim 11, wherein said software algorithm further implements a second digital fourier transform algorithm operating at a different sampling rate from said first digital fourier transform algorithm, the ratio of the first and second digital fourier transform outputs being proportional to said network frequency.

13. A programmable frequency sensitive relay as claimed in claim 7 wherein the frequency detection means further includes a network frequency band pass filter.

14. A programmable frequency sensitive relay as claimed in claim 12 wherein the frequency detection means further includes a network frequency band pass filter.

* * * * *